United States Patent [19]

Jacobsen et al.

[11] Patent Number: 4,792,180

[45] Date of Patent: Dec. 20, 1988

[54] VEHICLE BODY ROOF CONSTRUCTION AND MOLDING

[75] Inventors: Lawrence J. Jacobsen, St. Clair Shores; Fred F. Kleinert, Utica, both of Mich.

[73] Assignee: General Motors Corporation, Detroit, Mich.

[21] Appl. No.: 10,241

[22] Filed: Feb. 2, 1987

[51] Int. Cl.$^4$ .............................................. B60D 25/06
[52] U.S. Cl. ................................... 296/210; 296/213; 296/93
[58] Field of Search ............... 296/201, 210, 208, 213, 296/93, 195; 49/485, 486, 493, 494

[56] References Cited

U.S. PATENT DOCUMENTS

| | | | |
|---|---|---|---|
| 2,156,681 | 5/1939 | Dewhirst et al. | 94/18 |
| 3,711,147 | 1/1973 | Higuchi et al. | 296/213 X |
| 4,304,435 | 12/1981 | Everts et al. | 296/213 |
| 4,312,153 | 1/1982 | Parkinson et al. | 49/485 |
| 4,322,105 | 3/1982 | Onda | 296/93 |
| 4,417,762 | 11/1983 | Imai et al. | 296/210 |
| 4,438,867 | 2/1984 | Perry et al. | 296/213 X |
| 4,444,428 | 4/1984 | Iwakura et al. | 296/213 X |
| 4,618,181 | 10/1986 | Tokuda et al. | 296/191 |
| 4,634,173 | 1/1987 | Aonuma et al. | 296/188 |

FOREIGN PATENT DOCUMENTS 0259522  12/1985  Japan .................... 296/93

Primary Examiner—Robert B. Reeves
Assistant Examiner—Russell D. Stormer
Attorney, Agent, or Firm—Charles E. Leahy

[57] ABSTRACT

A vehicle body includes a roof panel having an edge flange and a rear quarter panel including a sail panel portion having an edge flange. The panels have flanges overlapping one another and welded together to define a tap having a bottom wall and laterally spaced apart side walls. A door weatherstrip is mounted on the roof panel flange forwardly of the quarter panel so that the closed position of the door defines a gap between the door and the roof panel which is a rectilinear extension of the gap between the roof panel and the sail portion of the rear quarter panel. A molding for filling the roof gap includes a central body having continuously extending fins along each side edge thereof reaching downwardly toward the gap bottom wall. The fins have a width greater than the maximum space between the laterally spaced side walls of the gap and yield upon insertion of the molding into the gap so that the molding fully fills the gap. An adhesive secures the molding on the gap bottom wall. The forward end of the molding has a tongue extending forwardly beneath the door weatherstrip to further attach the molding in the gap. The rearward end of the molding has a tongue extending rearwardly beneath the reveal molding of the rear window to further attach the molding to the vehicle body.

1 Claim, 1 Drawing Sheet

VEHICLE BODY ROOF CONSTRUCTION AND MOLDING

The invention relates to a vehicle body roof construction including a molding filling a gap between welded together flanges of a roof panel and a rear quarter panel.

BACKGROUND OF THE INVENTION

Traditionally, the welded together joint between adjacent vehicle body panels has been filled with lead or plastic and then sealed and painted to provide an invisible joint.

In other vehicle body constructions, the adjacent edge portions of the vehicle body panels are provided with flanges which are welded together, thereby leaving a gap between the two panels. Then, a suitable molding is mounted within the gap to conceal the joint.

The present invention relates to a new and improved vehicle body construction in which the edge flanges are welded together and a new and improved molding is provided for concealing the flanged attachment and filling the gap.

SUMMARY OF THE INVENTION

A vehicle body includes a roof panel having a flange along the edge thereof and a rear quarter panel including a sail panel portion having a flange. The flanges overlap one another and are welded together, thereby defining a gap therebetween having a bottom wall and laterally spaced apart side walls. A door weatherstrip is mounted on the roof panel flange forwardly of its welded attachment to the quarter panel so that the closed position of the door defines a gap between the door and the roof panel which is a colinear extension of the gap between the roof panel and the sail portion of the rear quarter panel. A molding for filling the gap includes a central body having continuously extending fins along each side edge thereof reaching downwardly toward the bottom wall of the gap with the fins having a width greater than the maximum space between the laterally spaced side walls of the gap and being flexible to yield upon insertion of the molding into the gap so that the molding fully fills the gap. An adhesive tape secures the bottom surface of the molding on the bottom wall of the gap. The forward end of the molding preferably extends forwardly and beneath the door weatherstrip to further attach the molding in the gap. In addition, the rearward end of the molding preferably extends rearwardly beneath the reveal molding of the rear window to further attach the molding to the vehicle body.

BRIEF DESCRIPTION OF THE DRAWINGS

These and other objects, features and advantages of the invention will become apparent upon consideration of the specification and the appended drawings in which.

DESCRIPTION OF THE PREFERRED EMBODIMENT

Figure 1:
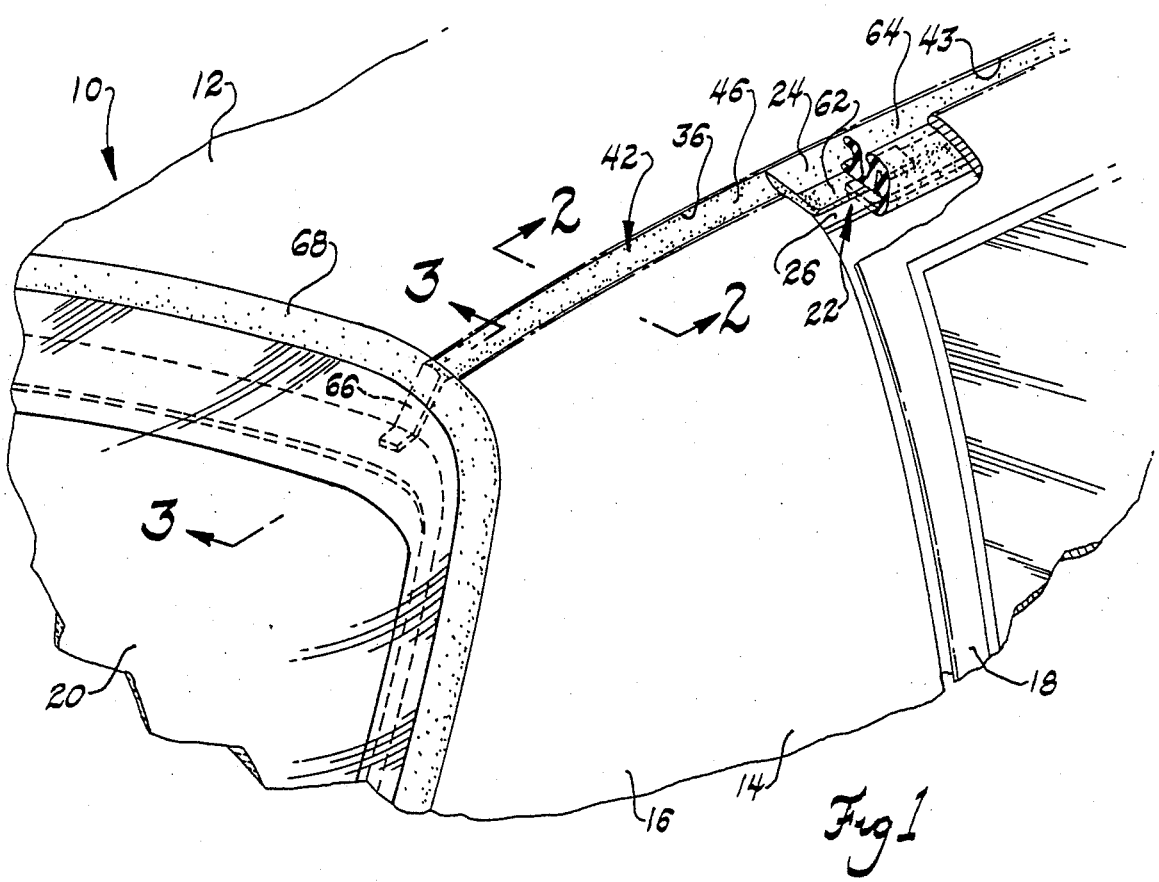
FIG. 1 is a perspective view of a vehicle body construction according to the invention having parts broken away into sections.

Referring to FIG. 1, it is seen that a vehicle body 10 includes a roof panel 12, a rear quarter panel 14 having a sail portion 16, a vehicle door 18, and a rear window 20.

Figure 2:
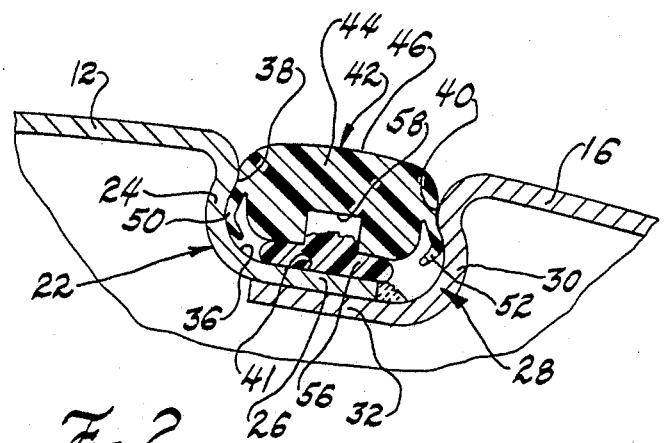
FIG. 2 is a sectional view through the gap molding taken in the direction of the arrows 2—2 of FIG. 1.

As best seen in FIG. 2, the roof panel 12 has a laterally outer edge defined by a downturned flange structure 22 including a vertical wall 24 and a horizontal wall 26. Likewise, the sail portion 16 of rear quarter panel 14 includes a downturned flange 28 including a vertical wall 30 and a horizontal wall 32. The horizontal wall 26 of the roof panel 12 overlies the horizontal wall 32 of the sail portion 16 and is suitably welded thereto. The vertical wall 24 of the roof panel 12 is laterally spaced from the vertical wall 30 of sail portion 16 so that a gap 36 is defined between the roof panel 12 and the sail portion 16 by side walls 38 and 40, respectively, provided by the vertical walls 24 and 30 and a bottom wall 41 defined by the overlapping horizontal walls 26 and 32.

As best seen by reference to FIG. 1, the vertical wall 24 of the roof panel 12 extends in a straight line from the rear window 20 forwardly along the sail portion 16 and along the door 18. Furthermore, it is seen that the width of the gap 36 is substantially the same as the gap 43 between the edge of the door 18 and the roof panel 12 so that the gaps extend in aesthetically pleasing colinear alignment. As best seen in FIG. 2, the vertical walls 24 and 30 of the roof panel 12 and sail portion 16 have an S-shaped bend so that the horizontal walls 26 and 32 may overlie each other to the full extent necessary for efficient welded securement therebetween and yet the width of the gap 36 is consistent with the gap between the edge of the door 18 and the roof panel 12.

As best seen in FIG. 2, a resilient plastic molding 42 for filling the gap 36 is of injection molded plastic and includes a central portion 44 having a top surface 46 for surface to surface alignment with the roof panel 12 and the sail portion 16. In order to accommodate dimensional variation in the spacing between the side walls 38 and 40 of the gap 36, the molding 42 includes a pair of resilient lips 50 and 52 which project downwardly from the central body and have a normal width greater than the normal width of the gap 36. Accordingly, when the molding 42 is installed in the gap 36 the resilient lips 50 and 52 will center the molding 42 and adjust the width of the molding 42 to substantially fill the width of the gap 36. For example, each of the resilient lips may flex through one millimeter of movement so that the molding will fill a gap varying between 6.5 and 8.5 millimeters.

Referring again to FIG. 2, it is seen that the molding 42 is attached within the gap 36 by a vinyl tape adhesive 56 which acts between the underside of the central body 44 and the bottom wall 41 of the gap. The underside of the molding preferably has a central cavity 58 which will receive a portion of the vinyl tape 56 in the event that the molding 42 must be pushed further downwardly into the gap 36 in order to flush the upper surface 46 of the molding with the adjacent surfaces of the roof panel 12 and the sail portion 16.

Figure 3:
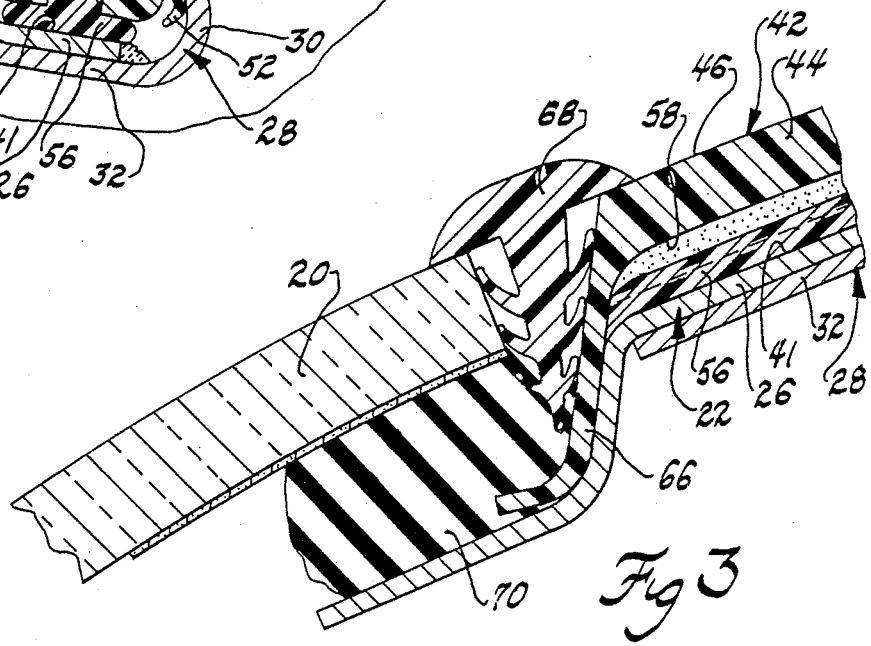
FIG. 3 is a sectional view taken in the direction of the arrows 3—3 of FIG. 1.

As best seen in FIG. 1, the forward end of the molding 42 has an integrally molded tongue 62 which extends beneath the door weatherstrip 64 to further attach the molding to the vehicle body. Likewise, as best seen in FIGS. 1 and 3, the rearward end of the molding 42 preferably has a integrally molded tongue 66 which extends beneath the rear window reveal molding 68 and the adhesive 70 securing the rear window 20 to the vehicle body. Reference may be had to U.S. Pat. No. 4,165,119, window reveal molding, for a more complete description of the molding 68. Accordingly, the forward and rearward ends of the molding 42 are substantially secured against dislodgment, as by car wash brushes.

Thus it is seen that the invention provides a new and improved roof construction and gap filler molding therefor.

The embodiments of the invention in which an exclusive property or privilege is claimed are defined as follows:

1. A roof construction for a vehicle body having a door, comprising,
   a roof panel having a generally rectilinear lateral edge flange continuous along the outer edge thereof with a forward portion and a rearward portion, the forward portion thereof defining an opening for the door and having a weatherstrip for sealing the door opening when closing movement of the door carries the door into proximity with the lateral edge flange, thereby defining a gap between the door and the lateral edge flange;
   a rear quarter panel having a sail portion with a lateral edge flange;
   means attaching the lateral edge flange of the sail portion with the rearward portion of the lateral edge flange of the roof panel, thereby defining a gap generally colinear with the gap flange of the roof panel, said gap having a bottom wall and spaced apart side walls;
   a molding for filling the gap, said molding having a longitudinal extending central body having an upper surface adapted to bridge across the gap between the roof panel and the sail portion, longitudinal continuous extending lips along each side edge of the central body and reaching downwardly toward the bottom wall, said lips having a width greater than the maximum spacing between the laterally spaced side walls of the gap and being flexible to yield upon insertion of the molding into the gap so that the gap is fully filled, and said central body of the molding having a generally planar bottom surface;
   adhesive means acting between the bottom surface of the molding and the bottom wall of the gap;
   a rear window opening defined by the roof panel and the sail portion of the rear quarter panel and having a window panel mounted therein and a window reveal molding surrounding the window panel;
   and said molding for filling the gap having a tongue at the forward end extending beneath the weatherstrip and a tongue at the rearward end extending beneath the window reveal molding to further attach the molding to the vehicle body.

* * * * *